United States Patent

Sage et al.

[15] 3,682,003

[45] Aug. 8, 1972

[54] FLUID ROTOR ANGULAR RATE SENSOR AND THREE-AXIS ANGULAR RATE SENSOR UTILIZING THE SMAE

[72] Inventors: Bradley B. Sage, Pleasant Hill; Heino Kase, Walnut Creek, both of Calif.

[73] Assignee: Systron-Donner Corporation, Concord, Calif.

[22] Filed: May 7, 1969

[21] Appl. No.: 822,369

[52] U.S. Cl. .................................................73/503
[51] Int. Cl. ...........................G01p 3/44, G01p 7/00
[58] Field of Search.................73/505, 516, 517, 503

[56] References Cited

UNITED STATES PATENTS

| | | | |
|---|---|---|---|
| 2,225,716 | 12/1940 | Sexton | 73/516 |
| 2,878,352 | 3/1959 | Statham | 73/505 |
| 3,074,279 | 1/1963 | Morris | 73/517 |
| 3,131,565 | 5/1964 | Amzie | 73/516 |
| 3,176,518 | 4/1965 | Morris et al. | 73/517 |
| 2,613,071 | 10/1952 | Hansel | 73/503 |
| 3,258,977 | 7/1966 | Hoffman | 74/5.34 |
| 3,529,240 | 9/1970 | Sanders | 73/105 |
| 3,520,196 | 7/1970 | Morris et al. | 73/516 |

*Primary Examiner*—Charles A. Ruehl
*Assistant Examiner*—Herbert Goldstein
*Attorney*—Flehr, Hohbach, Test, Albritton and Herbert

[57] ABSTRACT

Fluid rotor angular rate sensor with a single sensitive axis having means forming a substantially continuous passageway and having a fluid mass in the passage serving as a fluid rotor. A paddle member is disposed in the passageway and inhibits movement of the fluid rotor in the passage. Means is for provided for sensing the position of the paddle member in the passageway. Electrical means is connected to the means for sensing the position of the paddle member and for applying a restoring force directly to the paddle member which is proportional to the force necessary to accelerate the fluid rotor as the rate sensor is accelerated about the single sensitive axis. The electrical means produces a signal proportional to the angular acceleration and includes means for integrating the signal to provide an output proportional to the rate of turn of the rate sensor about the single sensitive axis. In the three-axis angular rate sensor, three of the single axis angular rate sensors are mounted on X, Y and Z axes.

5 Claims, 10 Drawing Figures

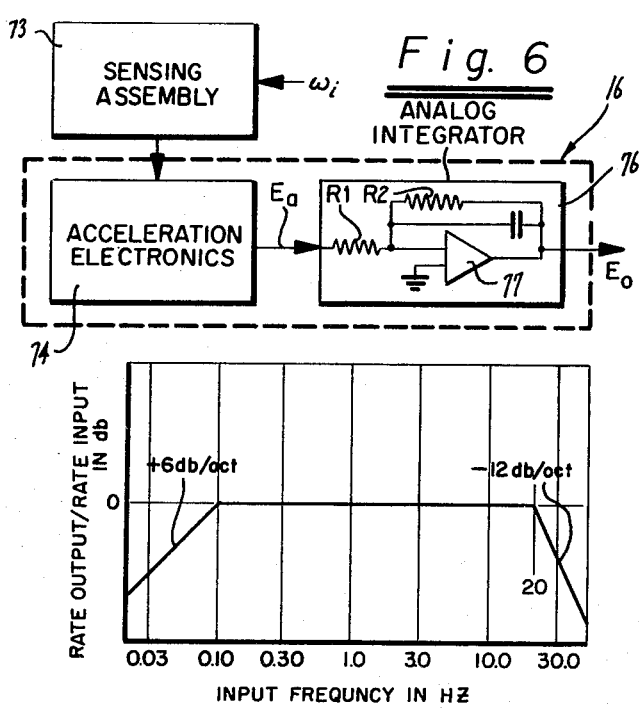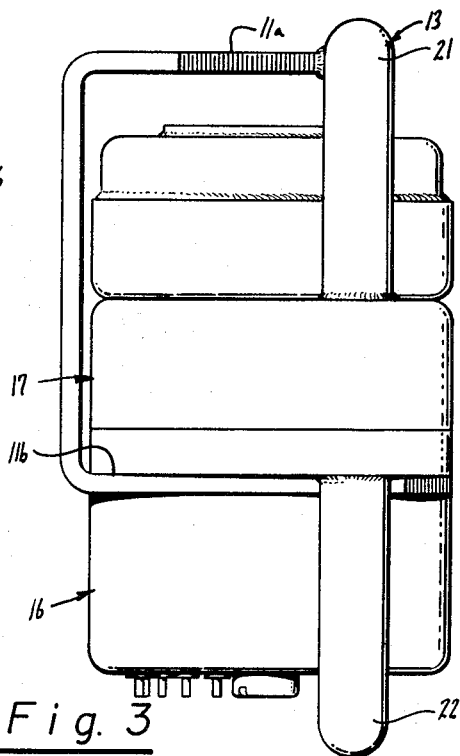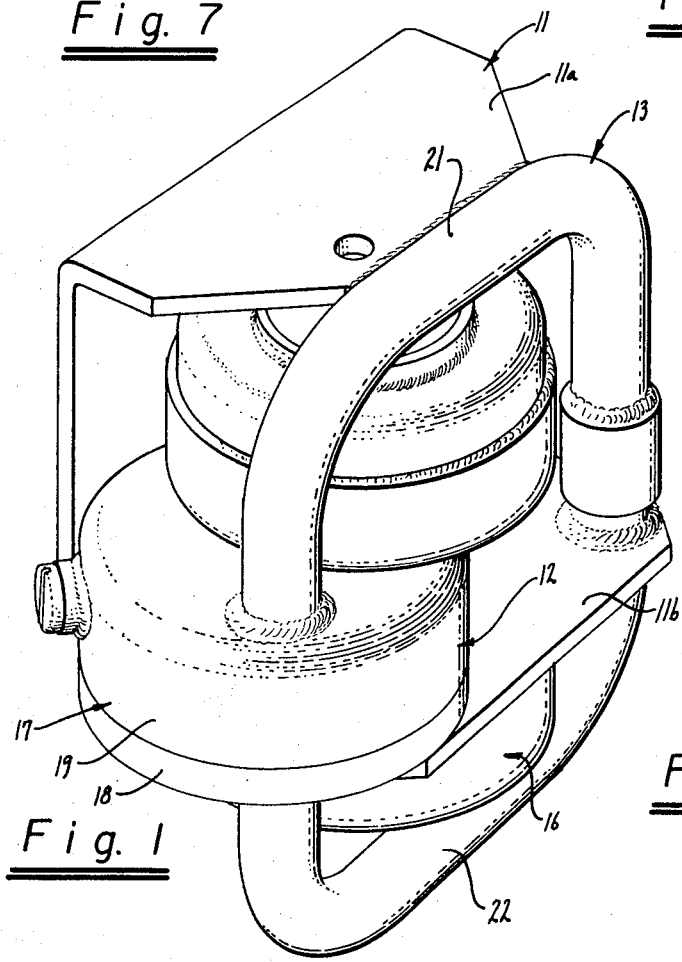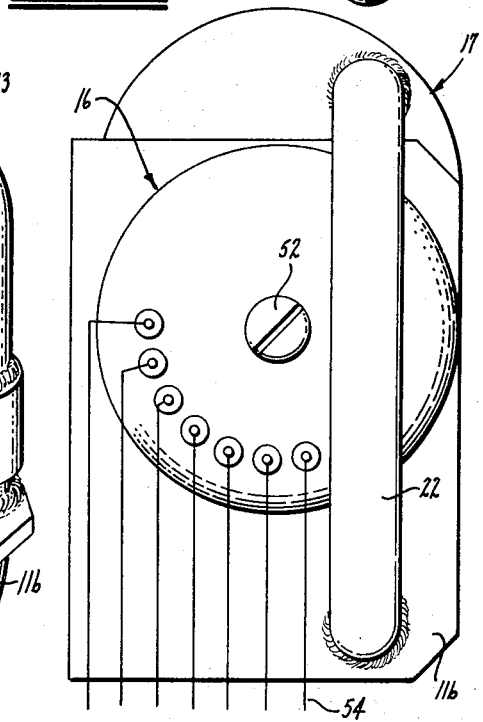

INVENTOR.
Bradley B. Sage
Heino Kase
BY Flehr, Hohbach, Test,
Albritton & Herbert
Attorneys INVENTOR.
Bradley B. Sage
Heino Kase
BY *Flehr, Hohbach, Test,
Albritton & Herbert*
Attorneys

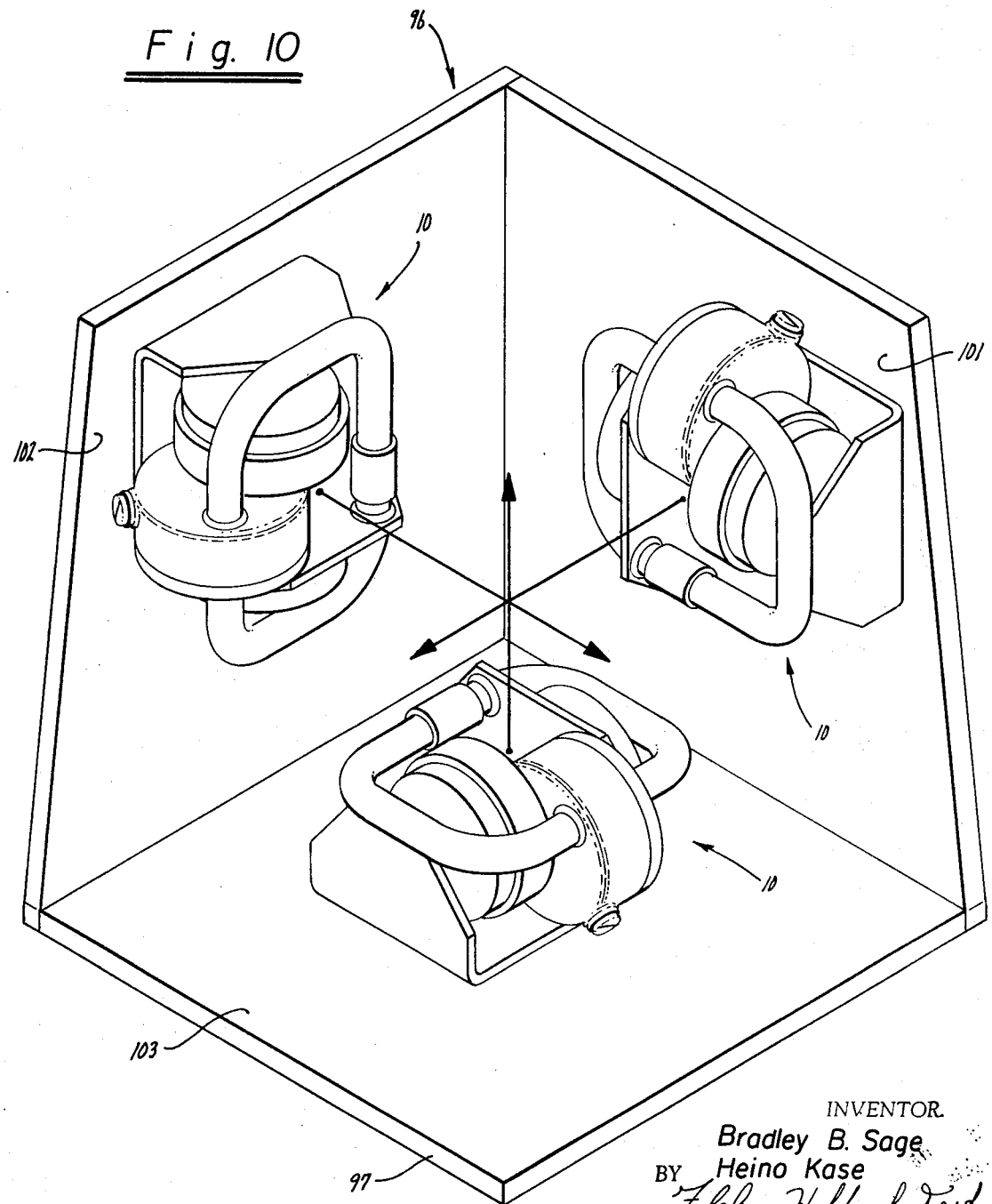

FLUID ROTOR ANGULAR RATE SENSOR AND THREE-AXIS ANGULAR RATE SENSOR UTILIZING THE SMAE

BACKGROUND OF THE INVENTION

Angular accelerometers have heretofore been provided. However, such angular accelerometers have been relatively expensive. Because of this reason, there are many fields of use for angular accelerometers which have been difficult to penetrate because of their high cost. There is, therefore, a need for a new and improved low cost angular accelerometer which can be used to provide an angular rate sensor.

SUMMARY OF THE INVENTION AND OBJECTS

The fluid rotor angular rate sensor with a single sensitive axis consists of a base plate on which means is mounted which forms a substantially continuous passageway which serves as a fluid rotor. A paddle member is pivotally mounted upon the base plate and is disposed in the passageway and is adapted to constrain the flow of fluid in the passageway. Means is provided for sensing the position of the paddle member in the passageway. Electrical means is connected to the means for sensing the position of the paddle member and for applying a restoring force directly to the paddle member which is proportional the force which is necessary to accelerate the fluid rotor as the base plate is accelerated about the single sensitive axis. The electrical means produces a signal proportional to the angular acceleration and includes means for integrating the signal to provide an output proportional to the rate of turn of the base plate about the single sensitive axis. In the three-axis angular rate sensor, three of the single sensitive axis rate sensors are mounted on X, Y and Z axes.

In general, it is an object of the present invention to provide a fluid rotor angular rate sensor which can be manufactured economically.

Another object of the invention is to provide a rate sensor of the above character which has very high reliability and which does not suffer from life limitations and wear out.

Another object of the invention is to provide a rate sensor of the above character which only requires a d.c. power input and which provides a direct d.c. voltage output which is proportional to the angular acceleration or which, with processing, the angular rate.

Another object of the invention is to provide a rate sensor of the above character which can be incorporated into a three-axis angular rate sensor to take the place of a rate gyro.

Additional object and features of the invention will appear from the following description in which the preferred embodiments are set forth in detail in conjunction with the accompanying drawings.

BRIEF DESCRIPTION OF THE DRAWINGS

FIG. 1 is a perspective view of a fluid rotor angular rate sensor incorporating the present invention.

FIG. 2 is an end elevational view of the rate sensor shown in FIG. 1.

FIG. 3 is a side elevational view of the rate sensor shown in FIG. 1.

FIG. 6 is an operational block diagram of the rate sensor shown in FIG. 1.

FIG. 7 is a graph showing the frequency of response of the rate sensor shown in FIG. 1.

FIG. 10 is an isometric view of a three-axis angular rate sensor utilizing the single axis fluid rotor angular rate sensors of the type shown in FIGS. 1–5.

DESCRIPTION OF THE PREFERRED EMBODIMENTS

Figure 4:
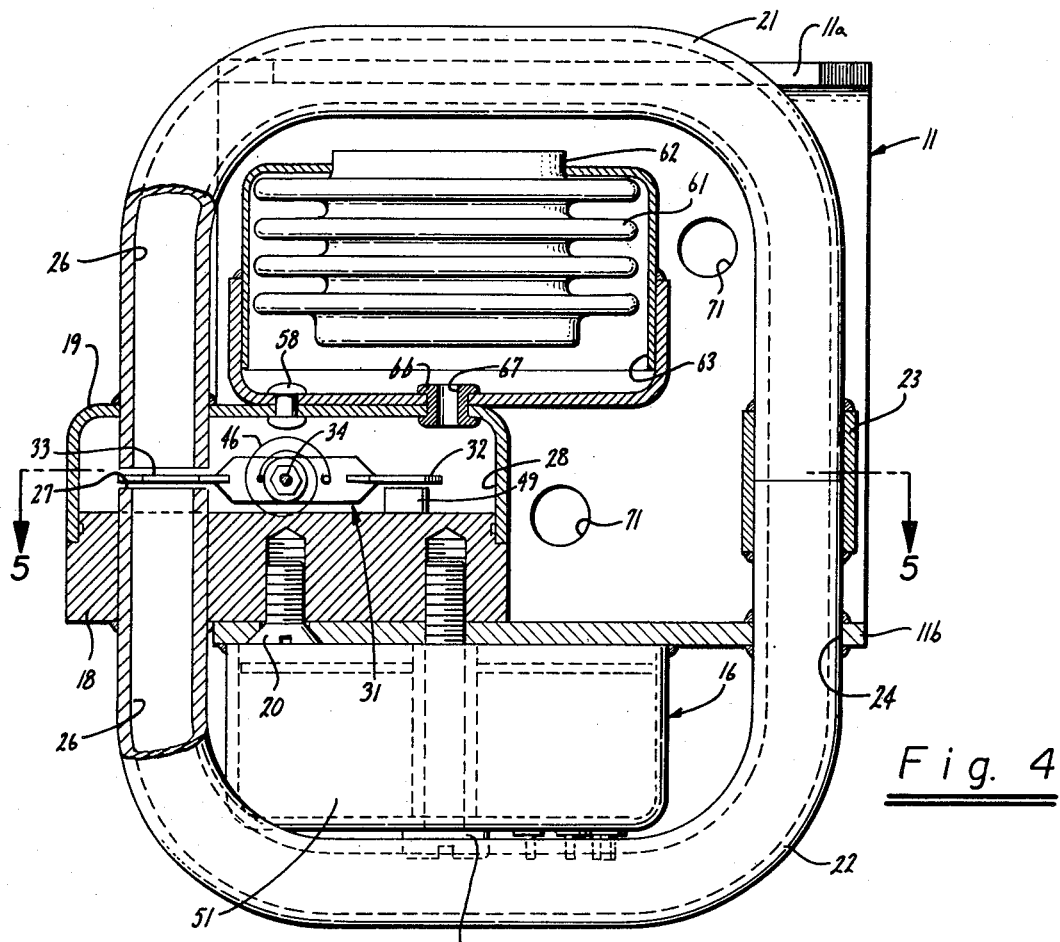
FIG. 4 is a top plan view of the rate sensor shown in FIG. 1 with certain parts in cross-section.

The fluid rotor angular rate sensor 10 consists of a generally U-shaped base plate 11 which is provided with two spaced generally parallel up-turned end portions 11a and 11b in which the end portion 11b has a height which is substantially greater than the height of end portion 11a. The rate sensor also consists of a sensing assembly 12 which is mounted upon the base plate 11 and which includes, as a part thereof, a tubular assembly 13 which is mounted in the sensing assembly and on the base plate 11. A bellows or expansion chamber 14 is mounted on the sensing assembly 12 and is also mounted upon the up-turned end portion 11a. An electronics module 16 is also mounted upon the base plate 11.

The sensing assembly 12 consists of a case 17 which is formed of a generally cylindrical base 18 and a generally cylindrical cover 19. The base 18 is secured to an upstanding portion 11b of the base 11 by a screw 20 (see FIG. 4). The tubular assembly 13 consists of two substantially U-shaped sections of tube 21 and 22. The section 22 is secured to the up-turned end portion 11a of the base 11 by suitable means such as welding and has one end extending through the cover 19 and has the other end extending into a coupling 23. The other section 22 has one end extending through the base 18 and has the other end extending through a hole 24 provided in the upturned portion 11b and is also mounted in the coupling 23. As can be seen, the two sections 21 and 22 generally facing each other so as to provide a substantially continuous or endless passageway 26. A small space 27 is provided between two adjacent ends of the sections 21 and 22 which is in communication with a space 28 provided within the cover 19. The passageway 26 and the space 28 within the cover 19 are filled with a suitable fluid such as a silicone oil. This silicone oil within the passageway 26 serves to provide an inertial fluid mass which also can be termed a fluid rotor which will have a tendency to remain stationary as the base plate 11 is subjected to angular acceleration about the single sensitive axis for the sensor.

Figure 5:
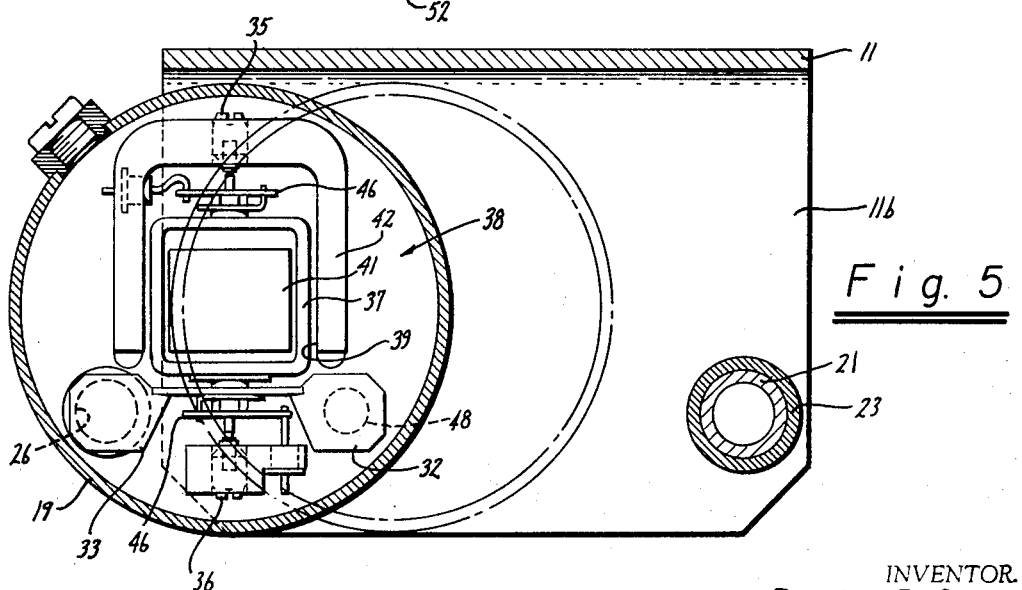
FIG. 5 is a cross-sectional view taken along the line 5—5 of FIG. 4.

Means is provided for sensing the force which is necessary to accelerate the fluid rotor as the base plate 11 is accelerated. This means consists of a paddle assembly 31 which is provided with a pair of spaced substantially planar end paddle members 32 and 33 which are mounted upon and generally extend upwardly from an elongate support member 34 as can be seen particularly in FIG. 5. The end paddle member 33 is disposed within the space 27 and is of a size which is substantially greater than the cross-sectional area of the passageway 26 to thereby impede or constrict the flow of the fluid through the passageway 26. As will be noted, the space 27 is slightly wider than the thickness of the paddle member 33 so as to permit some movement of the paddle member 33 in a direction parallel to the flow of fluid through the passageway 26.

Means is provided for pivotally mounting the paddle assembly 31 outside the fluid passageway 26 upper and lower pivot and jewel mountings 35 and 36. The paddle assembly 31 is a part of removing and restoring system which also includes a rectangular moving coil 37 that forms part of a torque motor 38 for applying a restoring force directly to the paddle assembly 31. The moving coil 37 is disposed in air gap 39 formed between a magnet 41 and a U-shaped soft iron yoke 42, both of which are mounted on the base 18 by a suitable means such as cement. The upper pivot and jewel mounting 35 is carried by the yoke 42 as the lower pivot and jewel mounting 36 is carried by a block 43 formed integral with the base 18. Hair springs 46 are provided on each end of the moving coil and are provided for supplying current to the moving coil. Thus, it can be seen that the paddle assembly is supported about its pivot axis so that there is substantially no constraint about its pivot axis in the absence of a restoring current supplied by the electronics module 16.

Means is provided for sensing the position of the paddle member 32 of the paddle assembly 31 and consists of a pick-off coil 48 which is carried by a mounting block 49 mounted upon the base 18. The pick-off coil 48 is connected to the electronics module 16 that is housed in a case 51 secured to the base plate 11 by a large screw 52 which extends through the case 51, through the end portion 11b of the base plate 11 and is threaded into the base 18. A plurality of terminals 53 are mounted upon the module 16 and have connected thereto a plurality of leads 54.

The bellows assembly 14 consists of a generally cylindrical base 56 and a generally cylindrical cover 57 which is secured to the base. The base 56 is mounted upon the cover 19 of the electronics module 16 by suitable means such as a rivet 58. A beryllium copper bellows 61 is mounted in the hole 62 provided in the cover 57 and is disposed in the space 63 provided by the base 56 and the cover 57. The interior of the bellows 61 is open to the atmosphere, whereas the space 63 within the base 56 and the cover 57 is exposed to the oil pressure within the space 28 of the sensing assembly 12 through a grommet 66 which is mounted on the base 56 and in the cover 19. The grommet 66 is provided with a flow passage 67 that establishes communication between the space 63 and the space 28. The bellows assembly 14 which is provided is relatively large to accommodate the relatively large volume of fluid which is utilized in the accelerometer.

Several holes 71 are provided in the base plate 11 for mounting purposes.

All of the parts of the angular rate sensor thus far described with the exception of the electronics module 16 can be considered as forming a sensing assembly 73 as shown in FIG. 6 which is adapted to receive the angular acceleration indicated as $\omega_i 103$. The sensing assembly 73 is connected to the electronics module 16 as shown in FIG. 6. The electronics module 16 includes acceleration electronics 74 which produces an electrical output signal $E_a$ that is proportional to the acceleration. The acceleration electronics 74 can be of a type disclosed in Morris U.S. Pat. No. 3,074,279 in which the pick-off coil 48 is connected to an oscillator and in which the output of the oscillator is fed into a detector that has its output amplified by an output amplifier 14. The output of the amplifier is fed through a load resistance and through a feedback path to the moving coil 37 to cause the moving coil to supply a restoring force to the paddle assembly. The restoring force which is supplied to the moving coil determines the magnitude of acceleration being measured. The electronics provides a signal which is proportional to this rate of acceleration which is the signal $E_a$ shown in FIG. 6. This is supplied to an analog integrator 76 which also can be called the rate-of-turn or velocity electronics. As shown, the analog integrator 76 consists of an operational amplifier 77 which has an input resistor $R_1$. A feedback capacitor C is connected between the output of the operational amplifier and the input of the operational amplifier. An additional resistor $R_2$ is connected in parallel with the capacitor C and is provided for shunting the capacitor C.

Operation of the fluid rotor angular rate sensor 10 may now be briefly described. Let it be assumed that the angular rate sensor 10 has been placed in an environment in which it is to measure the rate of turn about its sensitive axis, namely, and axis coincident with the axis of rotation of the fluid rotor which is formed by the fluid mass in the endless annular passageway 26. When the sensor is subjected to angular rotation about the sensitive axis, a positive error signal is generated by the accelerometer as the fluid rotor (due to its inertia) tends to lag behind the accelerating case or base 11 of the sensor. The paddle member 33 disposed in the fluid path of the fluid rotor serves to constrain the fluid rotor to cause it to move with the case of the accelerometer. As soon as the fluid rotor causes a slight movement of the paddle member 33, the paddle member 32 will also be moved and this movement will be sensed by the pick-off coil 48. As explained in Morris U.S. Pat. No. 3,074,279 since the pick-off coil is excited by the oscillator electronics, the oscillator output is modulated by the variation in spacing between the end paddle member 33 and the pick-off coil. This is detected and changed to a high level current. The output amplifier brings the power level up to where sufficient current is applied to the moving coil to restore the paddle assembly to its zero or null position, preventing the fluid rotor from shifting in position and causing the fluid rotor to move with the case of the accelerometer. Thus, it can be seen that the power amplifier produces a power level which is sufficient to retain the paddle assembly in a zero or null position and the current which flows actually represents the acceleration acting upon the fluid rotor. For this reason, the output current is not a function of any resistance in the output circuit but is only a function of the acceleration which the accelerometer is undergoing.

The fluid rotor serves as the inertial mass in the accelerometer which is closely coupled to an almost weightless, low inertial torque motor operating in a closed loop fashion to sense the angular motion of the fluid rotor and to provide the torque necessary to constrain the rotor to move with the case of the accelerometer. Thus, the paddle assembly 31 supplies the force necessary to accelerate the fluid mass so that it moves with the case and prevents it from circulating.

The moving parts of the torque motor are symmetrical and are carefully balanced in and out of the fluid to assure a minimum G sensitivity of the finished accelerometer. The use of the neutrally buoyant torque motor rather than a neutrally buoyant mass reduces the balance problems by several orders of magnitude in initial value and as well, makes the G sensitivity of the unit almost independent of variation of fluid density with temperature.

Although the tubular assembly 13 is shown as lying in a plane, this is not necessary as long as the sensitive axis of the device can be determined.

As explained previously, the electronic module serves to close the servo loop around the sensor and to provide an electrical output signal $E_a$ proportional to the angular acceleration. As shown in FIG. 6, this angular acceleration is converted into a velocity signal by integrating it in the analog integrator 76. This analog integrator produces a signal which is proportional to the rate of turn of the sensor. To provide a substantially constant output from the integrator, the relatively large resistor R2 is placed across the analog integrating capacitor C which shunts the capacitor C that causes a small leakage current to flow to prevent saturation. The use of the analog integrator produces an electrical output signal E which is proportional to the rate of turn or velocity of the sensor.

The angular accelerometer is incapable of going down to d.c. in the range of signal frequencies because the angular accelerometer does not integrate. In such a case it merely amplifies the acceleration output $E_a$. Such results are shown in FIG. 7 which represents the frequency response of a typical fluid rate sensor in the form of bode asymptotes showing the band-pass characteristics of the fluid rate sensor with a flat response from 0.1 to 20 Hertz to input rates. Below 0.1 Hertz the output to a rate input would fall off at 6 lb. per octave. Above 20 Hertz, the natural cut-off of the sensing assembly 12 is reached and therefore the output would fall off at 12 lb. per octave.

It can be seen that this rate sensor has an unusual characteristic when compared with a conventional rate gyro. A rate gyro goes down to a d.c. output which will be steady with a steady input rate. In the rate sensor, the large resistor R2 eliminates the d.c. response to the input rate. However, the rate sensor will produce the proper rate signal as soon as the rate sensor is accelerated although that rate will decay to zero with a steady input rate.

Figure 8:
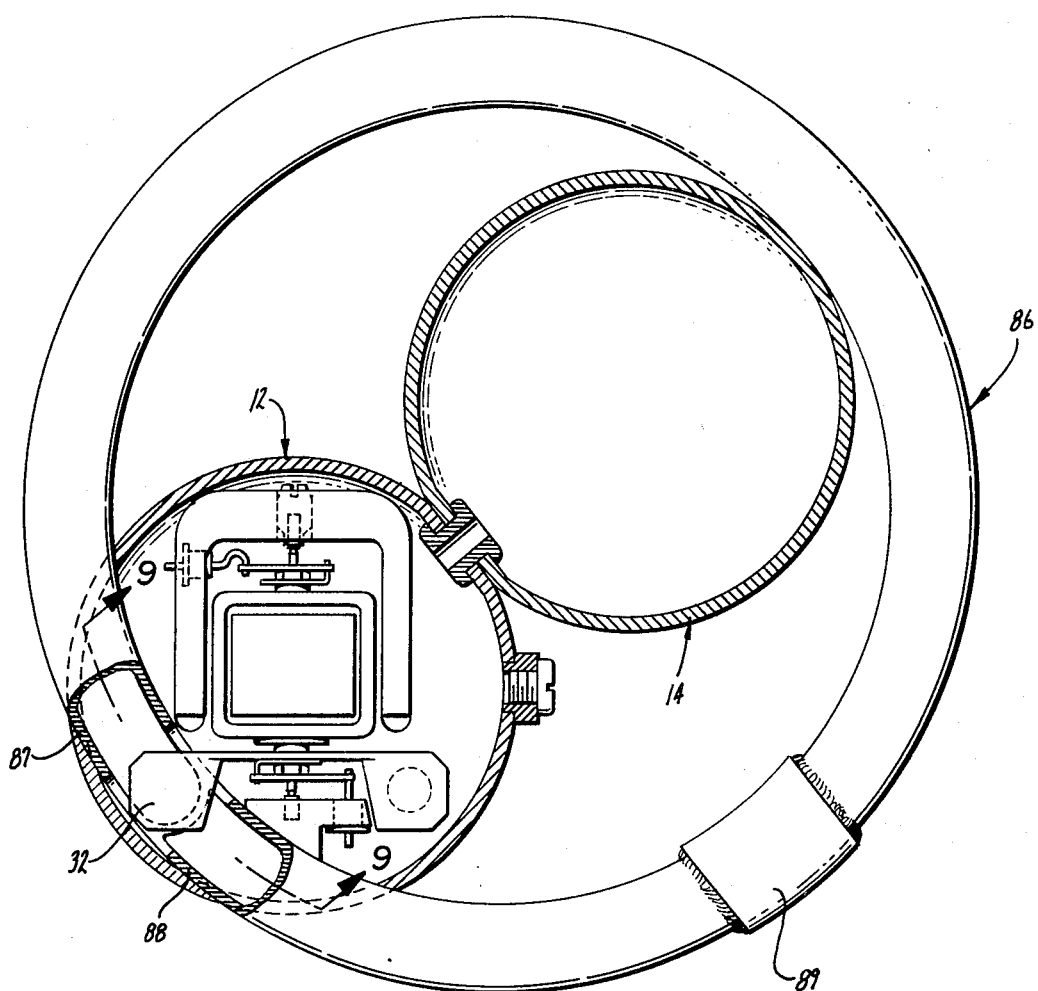
FIG. 8 is a cross-sectional view showing another embodiment of a fluid rotor angular rate sensor incorporating the present invention.
Figure 9:
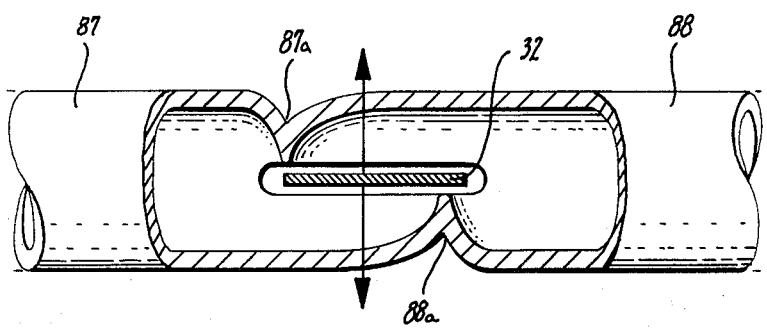
FIG. 9 is an enlarged cross-sectional view of a portion of the rate sensor shown in FIG. 8.

Another embodiment of the invention is shown in FIGS. 8 and 9 which is very similar to the embodiment which is shown in FIGS. 1–5 with the exception that the parts have been re-arranged so that the axis of sensitivity has been shifted by 90°. Thus, a base plate 81 has been provided which is narrower and which is provided with two upturned portions 81a and 81b. The sensing assembly 12 and the bellows assembly 14 have been provided with flats and have been arranged so that they are side by side and interconnected in the same manner that the two assemblies were interconnected in the previous embodiment. A tubular assembly 86 similar to the tubular assembly 13 has been provided and consists of tube sections 87 and 88 interconnected by a coupling 89. The tube sections 87 and 88 are mounted in the cover 19 of the sensing assembly 12 as shown in the cross-section in FIG. 9. As shown therein, the ends of the tubular sections 87 and 88 are joined together to provide indented portions 87a and 88a, respectively, so as to create a flow passage therebetween which is substantially perpendicular to the plane of the end member 32 of the paddle assembly 31. With this arrangement it can be seen that the entire angular accelerometer takes less space and that the expansion or bellows assembly 14 and the sensing assembly 12 are both within the confines of the tubular assembly 13. The operation of this embodiment of the invention is identical to that described for the embodiment shown in FIGS. 1–5. The paddle 32 again serves to constrain the fluid rotor disposed within the tubular assembly 86 as the base plate 81 is subjected to angular rotation about the sensitive axis for the angular rate sensor.

In FIG. 10 there is shown a three-axis angular rate sensor 96. It consists of a framework 97 which has three substantially planar plates 101, 102 and 103 Z planes. are fastened together to form X, Y and The sensitive axis for each single axis angular accelerometer is at right angles to the plate on which it is mounted. A single axis rate sensor of the type hereinbefore described is mounted on each of the plates 101, 102 and 103 to provide a three-axis or tri-axis rate sensor. This three-axis angular rate sensor 96 which is shown in FIG. 10 can be utilized as a direct replacement for a rate gyro system that is commonly utilized on aircraft. There are many advantages in doing this. The rate sensor normally would cost substantially less than a conventional rate gyro. It also would take much less space and would be much lighter. In addition, the reliability would be greatly increased and The maintenance required would be decreased very substantially.

Such a rate sensor is also advantageous in that it only requires a d.c. power output and provides a direct d.c. voltage output which is proportional to the angular acceleration or, with processing, the angular rate. Rate gyros, on the other hand, require an a.c. voltage for excitation and thus the errors are related to the frequency stability of the a.c. excitation. The d.c. output from the rate sensor is desirable in that it can be processed by filtering means and otherwise shaped without having to demodulate it as would be necessary with the a.c. output of a rate gyro.

The rate sensor would be utilized for detecting dynamic rather than static inputs as, for example, for detecting changing rates as would be found in yawing aircraft or pitching aircraft due to turbulence or erratically induced maneuvers. The output information which is obtained could be utilized in the auto pilot system which, in turn, would command the appropriate flight control surfaces of the aircraft to thereby cause the aircraft to fly smoothly and stably.

It is apparent from the foregoing that there has been provided a fluid rotor angular rate sensor utilizing the same which has many advantageous features permitting its use in many applications.

We claim:

1. In an angular rate sensor for sensing angular rate about a predetermined axis, means forming a base plate, a sensing assembly mounted on the base plate, said sensing assembly including means mounted on the base plate forming a substantially continuous passageway, a fluid disposed in said passageway, a paddle assembly mounted upon the base plate for pivotal movement and having a portion thereof disposed in the passageway and serving to inhibit the flow of fluid in the passageway, electrical means for retaining the paddle assembly in a predetermined position with respect to the base plate and providing an electrical output signal which determines the force which is necessary to accelerate the fluid in the fluid passageway as the base plate is accelerated about an axis, and additional electrical means for integrating the electrical output signal to provide an additional electrical output signal which is proportional to the rate of turn of the sensor, said additional electrical means including means to prevent the generation of a gradually increasing additional electrical output signal which could cause saturation, said additional electrical output signal having a band pass for a predetermined frequency range with upper and lower corner frequencies, the upper corner frequency being determined by the natural cut-off of the sensing assembly and said first named electrical means, said lower corner frequency being determined by the additional electrical means, said additional electrical output signal being nominally zero for a substantially constant input rate about said axis.

2. A sensor as in claim 1 wherein said electrical means for integrating the first named electrical output signal includes an operational amplifier, a capacitor connected between the output of the operational amplifier and the input of the operational amplifier and a resistor connected in parallel with the capacitor.

3. In an angular rate sensor, means forming a base, a sensing assembly mounted on the base plate, said sensing assembly including means mounted on the base forming a substantially continuous passageway about a sensitive axis, a fluid mass disposed in the passageway and forming a fluid rotor, a paddle assembly, means pivotally mounting the paddle assembly outside of the passageway about a pivot axis, the paddle assembly having a member disposed in said passageway in a direction at substantially right angles to the normal path of movement of the fluid mass in the passageway at the point where the fluid mass comes into contact with the member of the paddle assembly, means for sensing the position of the member in the passageway, said fluid mass serving to apply a force to the member of the paddle assembly when the base of the angular accelerometer is subjected to acceleration about the sensitive axis of the sensor, electrical means connected to the means for sensing the position of the planar member for applying a restoring force directly to the paddle assembly which is proportional to the force applied to the member by the fluid mass as the base is subjected to angular acceleration about the sensitive axis to constrain movement of the fluid mass in said passageway, said paddle assembly being supported about its pivot axis so that there is substantially no constraint about its pivot axis in the absence of the restoring force supplied by the electrical means, said electrical means providing an electrical output signal proportional to the acceleration measured, and additional electrical means for integrating the electrical output signal to provide an additional electrical output signal which is proportional to the rate of turn of the sensor, said additional electrical means including means to prevent the generation of a gradually increasing additional electrical output signal which could cause saturation, said additional electrical output signal having a band pass for a predetermined frequency range with upper and lower corner frequencies, the upper corner frequency being determined by the natural cut-off of the sensing assembly and said first named electrical means, said lower corner frequency being determined by the additional electrical means, said additional electrical output signal being nominally zero for a substantially constant input rate about said axis.

4. A sensor as in claim 3 wherein said means for integrating the first named electrical output signal includes an operational amplifier, a capacitor connected between the output of the operational amplifier and the input of the operational amplifier and a resistor connected in parallel with the capacitor.

5. In a three-axis angular rate sensor, means forming a framework, first, second and third single-axis angular rate sensors, means mounting said first, second and third single-axis angular rate sensors on said framework so that said single axis angular rate sensors have their sensitive axes disposed on X, Y and Z axes, respectively, each of said single axis angular rate sensors including means forming a base, means mounted on the base forming a substantially continuous passageway, a fluid mass disposed in the passageway and forming a fluid rotor, a paddle assembly mounted upon the base plate for pivotal movement and having a substantially planar member forming a part thereof and disposed in the fluid passage and serving to constrain movement of the fluid mass in the passageway, means for sensing the position of the member in the passageway, said fluid mass serving to apply a force to the member of the paddle assembly when the base is subjected to angular acceleration about the sensitive axis, electrical means connected to the means for sensing the position of the paddle member for applying a restoring force directly to the paddle member which is proportional to the force applied to the paddle member by the fluid mass as the base is subjected to angular acceleration to constrain movement of the fluid mass in the passageway, said electrical means including means for providing a signal which is proportional to the rate of angular acceleration and additional electrical means for integrating the signal to provide an electrical output signal which is proportional to the rate of turn, said additional electrical means including means to prevent the generation of a gradually increasing electrical output signal which could cause saturation, said additional electrical output signal having a band pass for a predetermined frequency range with upper and lower corner frequencies, the upper corner frequency being determined by the natural cut-off of the sensing assembly and said first named electrical means, said lower corner frequency being determined by the additional electrical means, said additional electrical output signal being nominally zero for a substantially constant input rate about said axis.

* * * * *